United States Patent

Juen et al.

Patent Number: 5,812,703
Date of Patent: Sep. 22, 1998

[54] IMAGING APPARATUS

[75] Inventors: Masahiro Juen; Tadao Isogai, both of Yokohama, Japan

[73] Assignee: Nikon Corporation, Tokyo, Japan

[21] Appl. No.: 672,261

[22] Filed: Jun. 26, 1996

[30] Foreign Application Priority Data

Jun. 26, 1995 [JP] Japan .................................. 7-182072

[51] Int. Cl.$^6$ ............................ G06K 9/40; H04N 1/409; H04N 5/217
[52] U.S. Cl. ......................... 382/274; 382/275; 348/243; 348/247; 358/461
[58] Field of Search ................................ 348/243, 241, 348/247; 382/274, 275; 358/463, 471, 482, 483, 461

[56] References Cited

U.S. PATENT DOCUMENTS

| | | | |
|---|---|---|---|
| 3,949,162 | 4/1976 | Malueg | 348/247 |
| 4,392,157 | 7/1983 | Garcia | 348/243 |
| 4,602,291 | 7/1986 | Temes | 348/243 |
| 4,772,957 | 9/1988 | Nakagawa et al. | 358/463 |
| 4,809,075 | 2/1989 | Akimoto et al. | |
| 5,355,164 | 10/1994 | Shimoyama et al. | 348/243 |
| 5,642,162 | 6/1997 | Maki et al. | 348/243 |
| 5,654,755 | 8/1997 | Hosier | 348/243 |

FOREIGN PATENT DOCUMENTS 52-122038 10/1977 Japan .

*Primary Examiner*—Scott Rogers
*Attorney, Agent, or Firm*—Foley & Lardner

[57] ABSTRACT

An imaging apparatus enables the fixed pattern noise data to be refreshed at any time without necessitating a backup power source or the like, while realizing high-quality image capturing and various modes of operation. This imaging apparatus comprises a non-volatile memory for storing a fixed pattern noise data for each pixel of an imaging device and a frame memory which can store an integrated value of image data for each pixel among a plurality of frames. The data read out from the respective memories and the output of the imaging device can be mutually operated by a processor and a controller. In order to record the output data of the processor, a signal recording processor is provided.

14 Claims, 10 Drawing Sheets

Fig. 5  TIMING CHART FOR CONTINUOUS IMAGE CAPTURE

IMAGING APPARATUS

BACKGROUND OF THE INVENTION

1. Field of the Invention

The present invention relates to an imaging apparatus and, in particular, to an imaging apparatus which can have a variety of functions with a relatively simple configuration by which fixed pattern noise such as that occurring due to dark current of an imaging device can be appropriately corrected and eliminated so as to attain a captured image with a high quality.

2. Related Background Art

In a storage type imaging device such as a CCD imaging device which stores photoelectric charges, each pixel is equipped with a photoelectric converter such as photodiode. The electric charge obtained when image light of an object is photoelectrically converted by the photoelectric converter is stored for a predetermined period and then output as an imaging signal. In general, since the dark current of the photoelectric converter varies from one pixel to another, there occurs a fixed pattern noise which is observed as a granular state at a fixed position on the image in an output where no light impinges on the imaging device, i.e., in a dark output.

Such a fixed pattern noise due to dark current remarkably occurs when the image storage time is long or the ambient temperature for the imaging device is high, thereby deteriorating the quality of the captured image. Also, it has been known that, in amplification type imaging devices and MOS type imaging devices, fixed pattern noise due to differences in threshold voltage values in horizontal switching elements and amplifier devices also exist in the dark output in addition to that due to dark current.

Accordingly, various kinds of correction circuits have conventionally been used in order to correct the fixed pattern noise of the dark signal and to improve the image quality. FIG. 1 shows a first example of such a fixed pattern noise correction circuit. In this drawing, the dark signal output, i.e., noise level, of each pixel is stored beforehand in a PROM 31 for one image plane. Then, based on a horizontal synchronizing signal HD and a frame synchronizing signal FVD, an address generator 32 sequentially supplies addresses to the PROM 31 so as to successively read out a storage data B from the PROM 31. Subsequently, the data B is subtracted from an output signal A from a non-depicted imaging device in synchronization therewith for each pixel in order to obtain a signal output X=A−B in which the fixed pattern noise has been corrected.

Also, FIG. 2 shows a second conventional example of the fixed pattern noise correcting circuit. The correction circuit of FIG. 2 has a signal processor 34 such as a digital signal processor, a frame memory 35 of FIFO (First In First Out) type, and a memory controller 36. In the circuit of FIG. 2, before an object image is captured, an imaging lens is covered with a lens cap, for example, so as to output dark signals for a predetermined number of image planes. Subsequently, the processor 34 integrally stores the dark signals for the predetermined number of image planes in the frame memory 35. Namely, an output A from an imaging device and a read-out output B from the frame memory 35 are added together in the processor 34 and thus obtained signal A+B is rewritten in the frame memory 35. Thus, a data obtained as a mean of a plurality of frames of the dark signals is stored. Since a mean of the dark signals for a predetermined number of frames is computed, only the fixed pattern noise component is extracted from the dark signal noise and then stored in the frame memory 35. In order to actually capture an image, the fixed pattern noise stored in the frame memory is read out, thus read-out value is divided by the integrated plane number n at the time of storing the fixed pattern noise, and then the resulting value is subtracted from the output signal A of the imaging device to yield the corrected signal output.

SUMMARY OF THE INVENTION

An object of the present invention is to make it possible to correct image signals obtained from imaging devices with appropriate fixed pattern noise signals, without necessitating a backup power source or the like, thereby enabling high-quality images to be always captured with their fixed pattern noise appropriately corrected.

Another object of the present invention is to realize an imaging apparatus which can appropriately correct fixed pattern noise and can be operated in a variety of operation modes using its memory provided for correcting the fixed pattern noise, thereby effectively utilizing the memory, while attaining a high image quality and a variety of functions.

In order to attain the above-mentioned objects, the imaging apparatus in accordance with the present invention comprises an imaging device which has a plurality of pixels and captures image light from an object so as to output an image signal corresponding thereto; a non-volatile memory for storing a data indicative of a fixed pattern noise for each pixel; a frame memory which can store an integrated value of image data for each pixel among a plurality of frames; and an arithmetic control circuit which can mutually operates the image signal output from the imaging device, the data read out from the non-volatile memory, and the data read out from the frame memory.

Also, such an imaging apparatus may be provided with a signal recording processor which records the data output from the arithmetic control circuit.

Preferably, the arithmetic control circuit is made such that it can subtract the data read out from the non-volatile memory from the signal value corresponding to the output of the imaging device and output the result thereof.

The frame memory may store an integrated data which is obtained when dark output values for each pixel of the imaging device are added together among a plurality of image planes; while the arithmetic control circuit may average the data read out from the frame memory, which has thus stored the data, so as to attain a fixed pattern noise data for each pixel, subtract thus attained data from the imaging device output, and then output the result.

Also, the frame memory may store an integrated data which is obtained when dark output values for each pixel of the imaging device are added together among a plurality of image planes; the arithmetic control circuit may average the data read out from the frame memory, which has thus stored the data, so as to attain a fixed pattern noise data for each pixel; and the non-volatile memory may be made rewritable such that the fixed pattern noise data can be written in the non-volatile memory.

Further, the arithmetic control unit may make the frame memory act as a buffer memory, subtract the data read out from the non-volatile memory from the output of the imaging device, output the result thereof while storing it in the frame memory, and allow the data read out from the frame memory, which has thus stored the data, to be output for the subsequent frame.

Also, the frame memory may subtract, from the output for each pixel from the imaging device, the data for the corresponding pixel read out from the non-volatile memory; integrate the resulting data for each pixel by adding together the data for each pixel among a plurality of image planes; store thus integrated data in the frame memory; and average the data read out from the frame memory by a predetermined number which does not always coincide with the number of the plurality of image planes so as to attain an image signal for each pixel.

Preferably, the frame memory is of FIFO type, while its input and output are separated from each other.

Also, the image can be continuously captured in the case where the frame memory is used as a buffer memory such that the data read out from the non-volatile memory is subtracted from the output of the imaging device whereby the result thereof is output and stored in the frame memory, the data obtained when the imaging device is continuously and successively exposed to image light are supplied to the signal recording processor by way of the frame memory, and then, after the recording processing of the data for one frame is completed in the signal recording processor, the data for the next frame is supplied from the frame memory.

Further, the image can be substantially captured for a long time without being influenced by fixed pattern noises in the case where an integrated data obtained when image data for a plurality of frames are added together in an exposure time shorter than a desired exposure time is stored in the frame memory and then thus stored data in the frame memory is output as being averaged by a number smaller than the number of the frames of the stored image data.

Moreover, preferably, in order to effect a multiple exposure operation in which a desired number of sheets of image are added together in an imaging step so as to be recorded in the signal recording processor, image data obtained with a reduced exposure time per shot such that the value integrating the desired number of sheets of image data is within the data width which can be stored in the frame memory are integrated, as being added together, and stored in the frame memory, while thus stored data is output as being averaged by a value smaller than the number of sheets of image subjected to the multiple exposure operation.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

In the case of the aforesaid first conventional example, the dark current of the imaging device changes due to the ambient temperature or the image storage time, thereby fluctuating a fixed pattern noise. In such a case, the fixed pattern noise data stored in the PROM may slightly differ from the fixed pattern noise actually output from the imaging device, whereby the fixed pattern noise may not sufficiently be eliminated by subtraction. Also, in order to write the fixed pattern noise data into the PROM, special jigs or devices have been needed.

Figure 1:
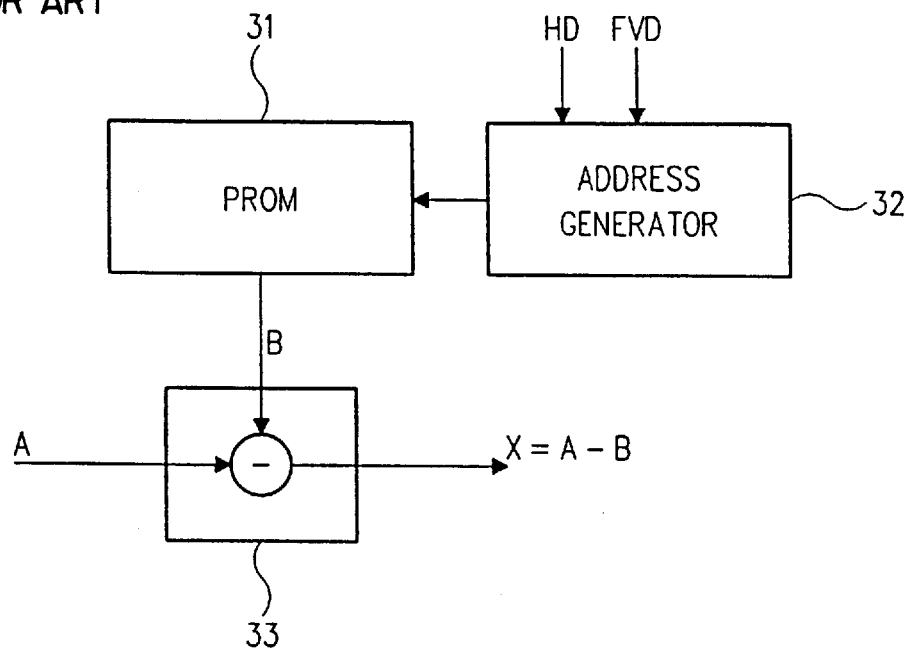
FIG. 1 is a block diagram showing a fixed pattern noise correcting apparatus in accordance with a first conventional example.
Figure 2:
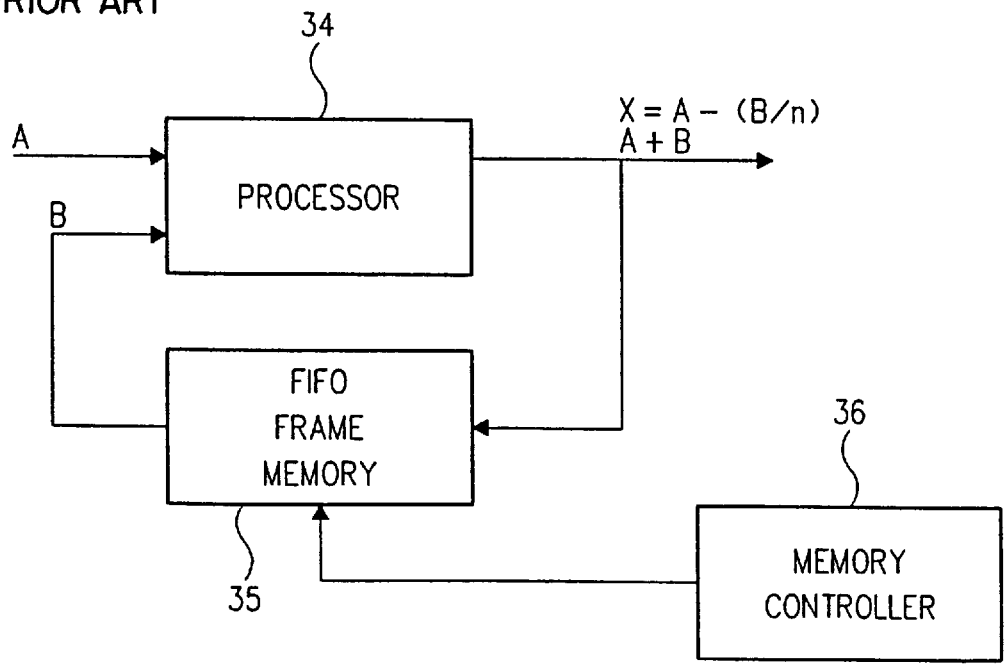
FIG. 2 is a block diagram showing a fixed pattern noise correcting apparatus in accordance with a second conventional example.

Also, in the second conventional example shown in FIG. 2, while the problem of the first conventional example does not occur since the fixed pattern noise just before capturing the image can be stored in the frame memory, non-volatile memories with a slow writing speed cannot be used therein in general in terms of the device configuration of the frame memory. Accordingly, its use is restricted to imaging apparatuses whose power is not turned off during the use in order to hold the fixed pattern noise signal. Alternatively, a special backup power source is needed in an apparatus such as an electronic camera in which the power source is turned off for each shot in order to save the power. Also, since it is necessary for the frame memory to record the integrated value of the dark output, the value of data to be stored for each pixel becomes large, thereby increasing the number of bits necessary for each pixel. Accordingly, at least several frames of memory capacity are necessary for the frame memory. However, only one frame of data, in which the data for each pixel stored in the frame memory are averaged, is actually used as a fixed pattern noise to be subtracted from the output of the imaging device, thereby wasting the memory capacity during the actual image-capturing operation.

Figure 3:
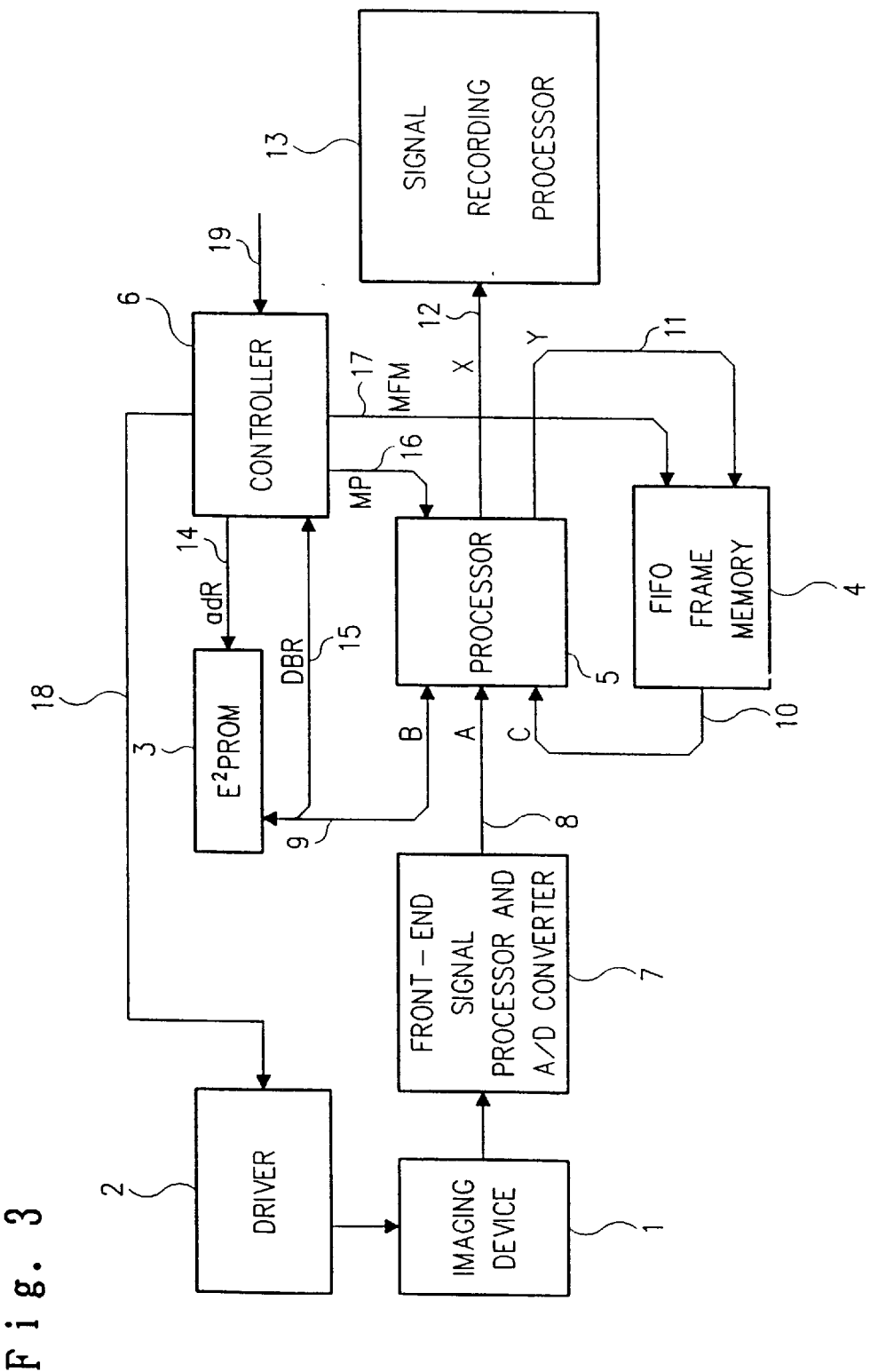
FIG. 3 is a block diagram showing a schematic configuration of the imaging apparatus in accordance with an embodiment of the present invention.

In the following, an embodiment of the present invention will be explained with reference to drawings. FIG. 3 shows an apparatus of an embodiment in which an imaging apparatus in accordance with the present invention is applied to a digital electronic camera. The apparatus of this drawing comprises an imaging device 1 constituted by CCD or the like, a driver 2 for providing various driving signals to the imaging device 1, and a non-volatile memory 3 such as E²PROM 3 for storing a fixed pattern noise data of the imaging device 1.

As the imaging device 1, an amplification type image sensor may also be used. An amplification type image sensor having a light-receiving section and an amplifier section separated from each other is, for example, disclosed in the U.S. patent application Ser. No. 08/606,995, which is incorporated herein by reference.

The apparatus of FIG. 3 further comprises a FIFO type frame memory 4, an arithmetic circuit or processor 5, a controller 6 for controlling each section of the circuit, a front-end signal processor and A/D converter 7 connected between the output of the imaging device and the processor 5, and a signal recording processor 13 for receiving a signal of the processor 5.

The imaging device 1 is constituted by CCD or the like and receives image light from an object which is not depicted. For such an operation, a necessary driving pulse is supplied from the driver 2 to the imaging device 1. The non-volatile memory 3 stores a data indicative of the level of a fixed pattern noise for each pixel based on dark current of the imaging device or the like. Here, it is constituted by an E²PROM which is electrically rewritable. The non-volatile memory 3 is connected to the processor 5 by a bi-directional data bus 9.

The frame memory 4 is a FIFO (First In First Out) type memory whose input bus and output bus are separated from each other so as to be suitable for processing images. The frame memory 4 can store an image data for each pixel, while the data width corresponding to each pixel has a size by which an integrated value of a plurality of sheets of image data can be recorded. For example, when the maximum data width of one sheet of image is 10 bits, the data width of the storage area of the frame memory 4 corresponding to each pixel is set to 11 bits or more. An output bus 10 of the frame memory 4 is connected to an input of the processor 5. An input bus 11 of the frame memory 4 is connected to the processor 5 so as to receive an output of the processor 5.

The processor 5 is constituted by an assembly of individual electronic circuits. Alternatively, it may be constituted by a digital signal processor (DSP). Also, the controller 6 may be unitedly formed with the processor 5 as a single processing device.

The front-end signal processor and A/D converter 7 performs an analog-region processing such as sample holding of the output signal from the imaging device 1 and converts thus processed signal into a digital signal, which is then input into the processor 5 by way of a digital image signal data bus 8.

The signal recording processor 13 subjects the image data received from the processor 5 by way of a data bus 12 to such a processing as data compression and records thus processed data. For this purpose, the signal recording processor 13 is equipped with a signal recording means such as a magnetic disk device, like a hard disk device, an optical disk device, a removable memory card, or flash memories.

In the apparatus of FIG. 3, the imaging device 1 captures the image light from the non-depicted object and thus obtained electric signal output is input into the front-end signal processor and A/D converter 7. In the front-end signal processor and A/D converter 7, thus input signal is subjected to a necessary analog-region pre-processing such as sample holding and then A/D-converted so as to be output by way of the digital image signal data bus 8, as an image data A, to the processor 5.

With respect to the input image data A, by using the fixed pattern noise data from the non-volatile memory 3 or the data from the FIFO frame memory 4, the processor 5 obtains a corrected image data X in which the fixed pattern noise component has been eliminated and supplies it to the signal recording processor 13 by way of the output bus 12. The detailed operation of the processor or arithmetic circuit 5 will be explained later. In the signal recording processor 13, the corrected image data X thus input from the processor 5 is subjected to data compressing processing or the like and then recorded in the hard disk device or the like. Thus recorded image data will be supplied to a non-depicted display device so as to be displayed later if necessary or printed by means of a printer or the like.

The processor 5 receives the control signal from the controller 6 by way of a control line 16 and can be operated in various modes so as to output various kinds of operation results as data X, Y, and B to the data buses 12, 11, and 9, respectively. In the following, various kinds of operation modes in the processor 5 will be successively explained.

(1) Preset Fixed Pattern Noise Correction Mode

In this mode, the read-out data B from the non-volatile memory 3 in which a fixed pattern noise data has been written beforehand is input into the processor 5 by way of the data bus 9, while the image data A which has been captured by the imaging device 1 and then transmitted through the front-end signal processor and A/D converter 7 is input into the processor 5. The processor 5 performs the following operations with respect to these data A and B and outputs the data X and Y to the signal processor 13 and the FIFO frame memory 4 by way of the data buses 12 and 11, respectively:

X=A−B
Y=A−B (2) Fixed Pattern Noise Integration Mode

In this mode, the output Y of the processor 5 for the first one frame is set to:

Y=A Namely, the image data obtained from the imaging device 1 is output as it is. Then, from the next frame to a predetermined number of frames (n−1), the following operation:

Y=A+C is performed so as to effect integration by addition while recording thus integrated signal in the frame memory 4. Accordingly, a data integrating the n frames of image data is recorded in the frame memory 4 and then the writing operation of the frame memory 4 is stopped.

(3) Real-Time Fixed Pattern Noise Correction Mode

In this operation mode, the following relationships:

X=A−(C/n)
Y=C are set, whereby the output image data X to the signal recording processor 13 becomes a value yielded when the image data A obtained from the imaging device 1 is corrected with a value which is obtained when the integrated data recorded in the frame memory 4 is averaged by the frame number n. The integrated data recorded in the frame memory 4 is divided by the frame number n so as to be averaged in order to suppress random noise. Also, the data read out from the frame memory 4 is used as the data to be written in the frame memory 4.

(4) Fixed pattern Noise Memory Refreshing Mode

In this mode, the fixed pattern noise data in the non-volatile memory 3 is refreshed with the storage data of the frame memory 4. Namely, the relationship:

B=(C/n)
is set, whereby the read-out data C from the frame memory 4 is averaged by the frame number n and written in the non-volatile memory 3 by way of the data bus 9. Accordingly, the data contents in the non-volatile memory 3 can be refreshed with the latest data contents when necessary. Here, in this mode, the data transfer clock is generated in synchronization with the writing period of the non-volatile memory 3.

(5) Simple Buffering Mode

In this operation mode, the frame memory 4 is used as an image memory for buffering such that the image data once stored in the frame memory 4 is also output for the subsequent frames.

Accordingly, in the first frame, the following relationship:

X=A−B is attained, while the following relationship:

X=C is used in the second and later frames. Also, the input for the frame memory 4 becomes:

Y=A−B

Accordingly, in this case, the data bus 9 connecting the non-volatile memory 3 and the processor 5 to each other acts as an output bus for supplying the read-out data of the non-volatile memory 3 to the processor 5. Here, the read-out and writing operations of the frame memory 4 in this mode can be stopped according to a control signal from the controller 6.

(6) Signal Integration Buffer Mode

In this mode, a data (A−B) obtained when the readout output B of the non-volatile memory 3 is subtracted from the image data A from the imaging device 1 is integrated for the n sheets of image planes and stored in the frame memory 4. Thus stored data is divided by m which does not always equal n, and then the resulting value is output to the signal recording processor 13. Accordingly, the following relationships:

X=C/m (wherein m can be set to a value not smaller than 1 but not greater than n)

Y=A−B (integration data for the first sheet)

Y=A−B+C (the second sheet to the n-th sheet) are set. After the integrated storage of the n sheets of data is completed, the writing into the frame memory 4 is stopped.

The relationship between the operation and each mode when the imaging apparatus provided with the foregoing operation modes is used as a digital electronic camera will be explained in detail according to the manipulation of the electronic camera.

In general, at the time when an electronic camera is shipped from its manufacturer, a fixed pattern noise occurring due to the dark output of the imaging device is recorded in the non-volatile memory 3 beforehand. For this purpose, at first, while a non-depicted shutter, stop, or the like is closed so as to block the image light incident on the imaging device, the imaging apparatus is operated in the above-mentioned fixed pattern noise integration mode of (2) so as to determine a fixed pattern noise data and to store it in the frame memory 4. Then, in the above-mentioned fixed pattern noise memory refreshing mode of (4), the fixed pattern noise data stored in the frame memory 4 is transferred to the non-volatile memory 3 and then stored there.

Figure 4:
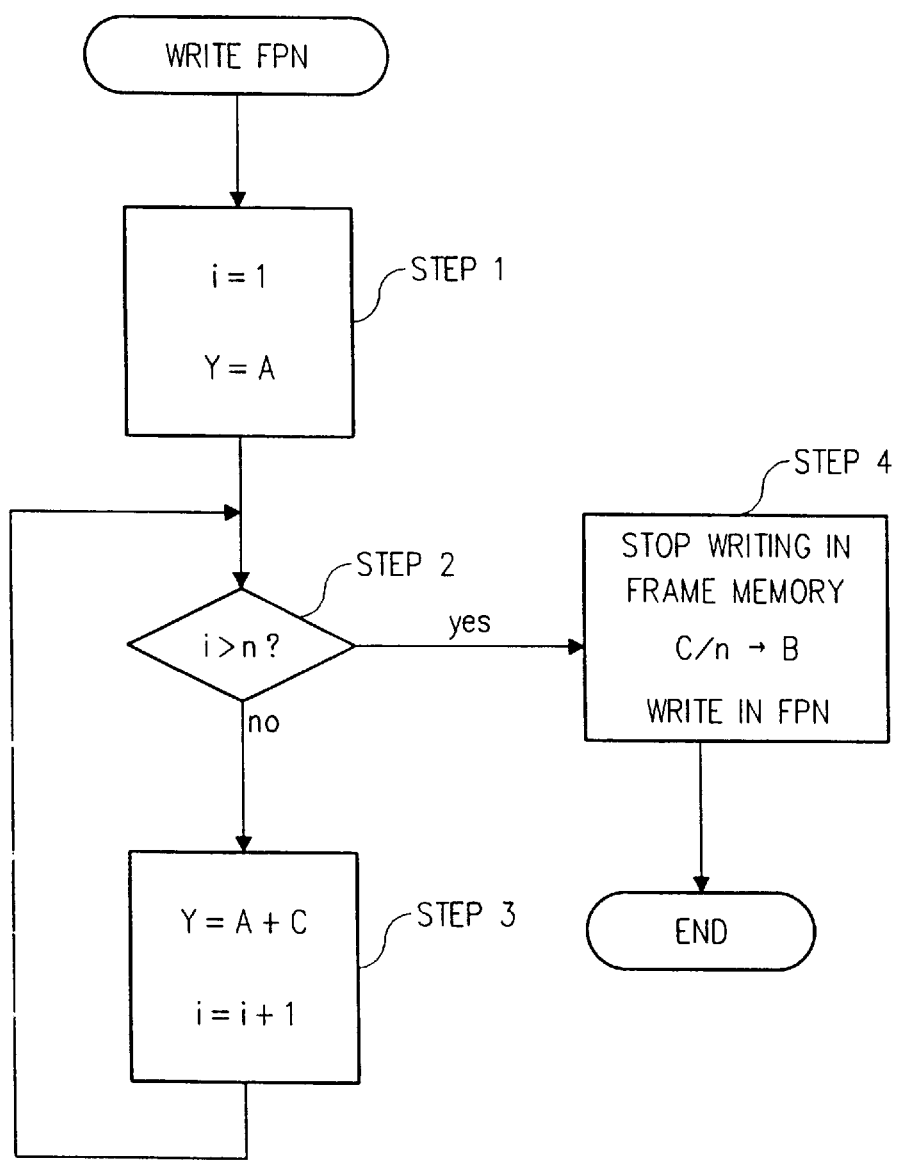
FIG. 4 is a control flow chart explaining a writing operation for a fixed pattern noise data in the imaging apparatus of FIG. 3.

FIG. 4 is a flow chart showing an operation for writing such a fixed pattern noise (FPN) data. In this chart, at step 1, the system is initialized so as to set parameter i=1, while the processor 5 sets its input A to the output Y for the frame memory 4. Namely, Y=A is set.

Then, at step 2, it is judged whether the parameter i is greater than the number n of integration or not. If not, the processing will proceed to step 3 where the fixed pattern noise is integrated with Y=A+C being set. In this manner, the integration of the fixed pattern noise is performed n times by steps 2 and 3.

When i is judged greater than n at step 2, the processing proceeds to step 4, where the fixed pattern noise is refreshed. Namely, at step 4, the writing of the frame memory 4 is stopped, while the value C/n, which is obtained when the output C of the frame memory 4 is divided by the integration number n, is written into the non-volatile memory 3 from the processor 5 by way of the data bus 9. Such refreshment of the fixed pattern noise data in the non-volatile memory 3 may be effected not only at the time of shipment by the manufacturer but also by a user of the camera at any time when necessary.

When the fixed pattern noise data is stored in the frame memory 4 as being integrated, since the dark output is small in general, the integration number n can be made greater than that determined by the bit width of the normal image-capturing signal and the bit width of the frame memory 4. For example, even in the case where the maximum bit width of the normal image-capturing signal is 10 bits while the bit width of the frame memory 4 is 12 bits, 32 times of integration can be performed when the dark output signal is at a level of 7 bits or less, thereby correspondingly improving the accuracy in detection of the fixed pattern noise.

Next, when the electronic camera is used to capture images sheet by sheet in a usual manner, the camera is operated in the above-mentioned preset fixed pattern noise correction mode of (1). Accordingly, the corrected data, which is obtained when the output data B from the non-volatile memory 3 is subtracted from the image data A attained on the basis of the output from the imaging device 1, is transferred per sheet to the signal recording processor 13 and recorded there.

In order to continuously capture images, the simple buffering mode of (5) is advantageously used. It is due to the fact that the signal recording processor 13 performs complicated time-consuming processing such as data-compressing processing and hard disk device writing processing. Namely, it is because the signal recording processing may not be immediately completed after one sheet of image data is transferred from the processor 5, whereby the next image data may not be input per frame.

Accordingly, in the above-mentioned preset fixed pattern noise correction mode of (1), the next image cannot be captured until the signal recording processor 13 accepts the data input. When the above-mentioned simple buffering mode of (5) is used, by contrast, the signal recording processor 13 can perform the next image-capturing operation immediately after the input of one sheet of image data thereinto is completed, such that thus obtained image data can be recorded in the frame memory 4. Then, after the signal recording processor 13 begins to accept the data input, the image data read out from the frame memory 4 is input into the signal recording processor 13.

These operations will be explained in detail with reference to FIGS. 3 and 5. In order to capture the first sheet for continuous image-capturing operations, after a sequence control input 19 (input of a release signal in response to a manipulation of a non-depicted release button) is supplied to the controller 6, the imaging device 1 enters an exposure preparation period PR. At time T1 after the exposure preparation period PR, the electronic shutter of the imaging device 1 is released such that exposure is effected during an exposure time Te1. At time T2 after this exposure time Te1 has passed, an imaging signal from the imaging device 1 is read out and then input into the processor 5 by way of the front-end signal processor and A/D converter 7. The processor 5 outputs the signal X=A−B which is obtained when the output B read out from the non-volatile memory 3 is subtracted from this input A.

After at least the first sheet of image data is completely transferred to the signal recording processor 13, the processor 5 enters a shutter preparation period PR for the second sheet, where the shutter for the second sheet is released so that exposure is effected during an exposure time Te2. At time T3, after this exposure time Te2, the imaging signal is read out from the imaging device 1 and then input into the processor 5 by way of the front-end signal processor and A/D converter 7. In this case, when the signal recording processor 13 does not accept the data input yet, the processor 5 enters the above-mentioned simple buffering mode of (5). Accordingly, the image data is kept from being newly output to the signal recording processor 13, while Y=A−B is output to the data bus 11 and recorded in the frame memory 4. This recording operation is performed for a period MW from time T3 which is identical to the period during which the imaging device 1 outputs the imaging signal. After the output from the imaging device 1 is completed and the frame 4 finishes writing data for one image plane, the writing operation is stopped, whereby the imaging device 1 attains its waiting state (W).

On the other hand, from time T1 at which the imaging device 1 begins to output the imaging signal for the first sheet, the signal recording processor 13 performs a signal recording processing for a period PROC1. Then, at time T4, where the signal recording processor 13 finishes recording the first sheet of image data and begins to accept the new data input, the processor 5 reads out the frame memory 4 from the top of the image plane during a period MR and inputs X=C to the signal recording processor 13. Substantially during a period PROC2 from time T4, the signal recording processor 13 performs processing and recording of the new image data.

Also, as mentioned above, when the signal recording processor 13 does not accept the data input even after the recording of Y=A−B into the frame memory 4 is completed, the writing into the frame memory 4 is stopped and waited.

Then, when the release signal still continues its image-capturing instruction state after the transfer of the image data X from the frame memory 4 to the signal recording processor 13 by way of the data bus 12 is completed, an operation similar to the capturing of the second sheet is continued thereafter. In this manner, the continuous image capturing operation is appropriately effected in response to the processing of the signal recording processor 13.

Figure 5:
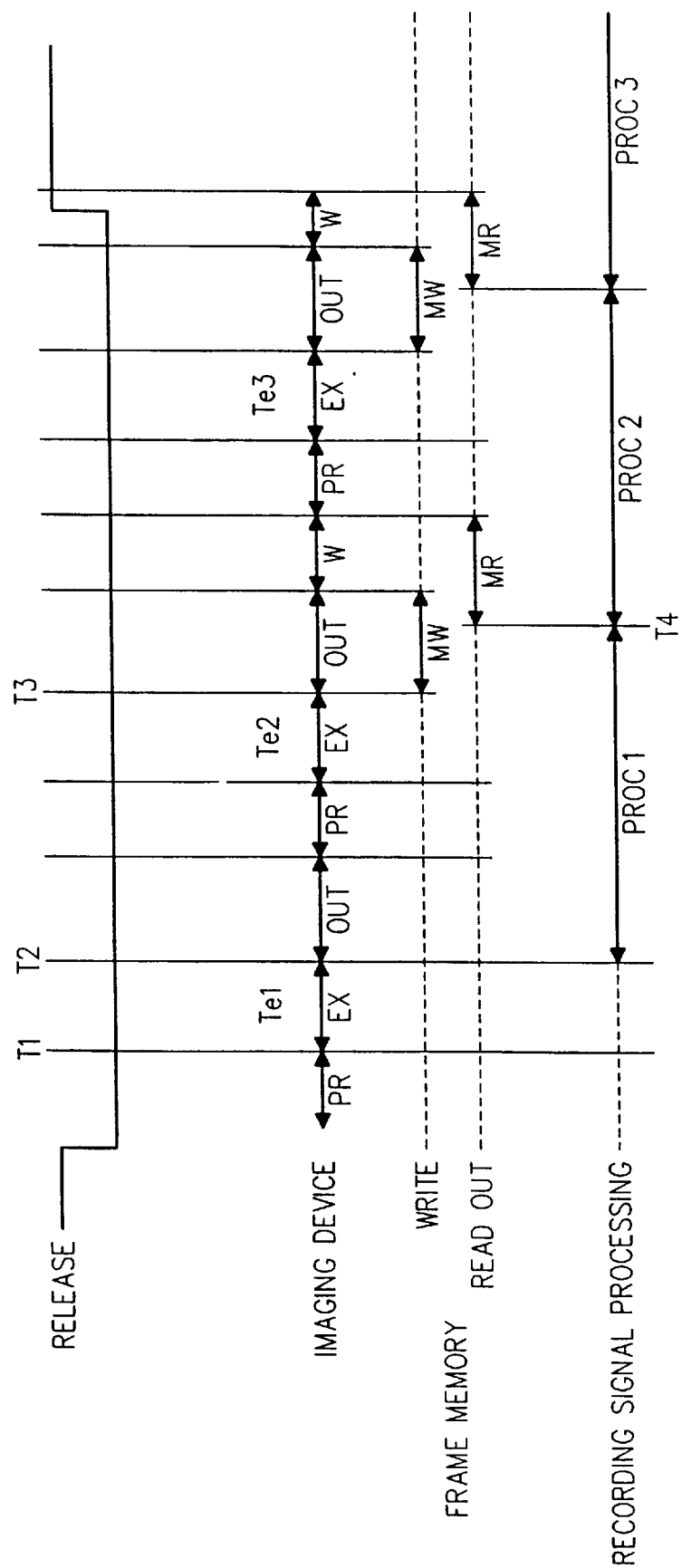
FIG. 5 is a timing chart explaining a continuous image-capturing operation performed by the imaging apparatus of FIG. 3.
Figure 6:
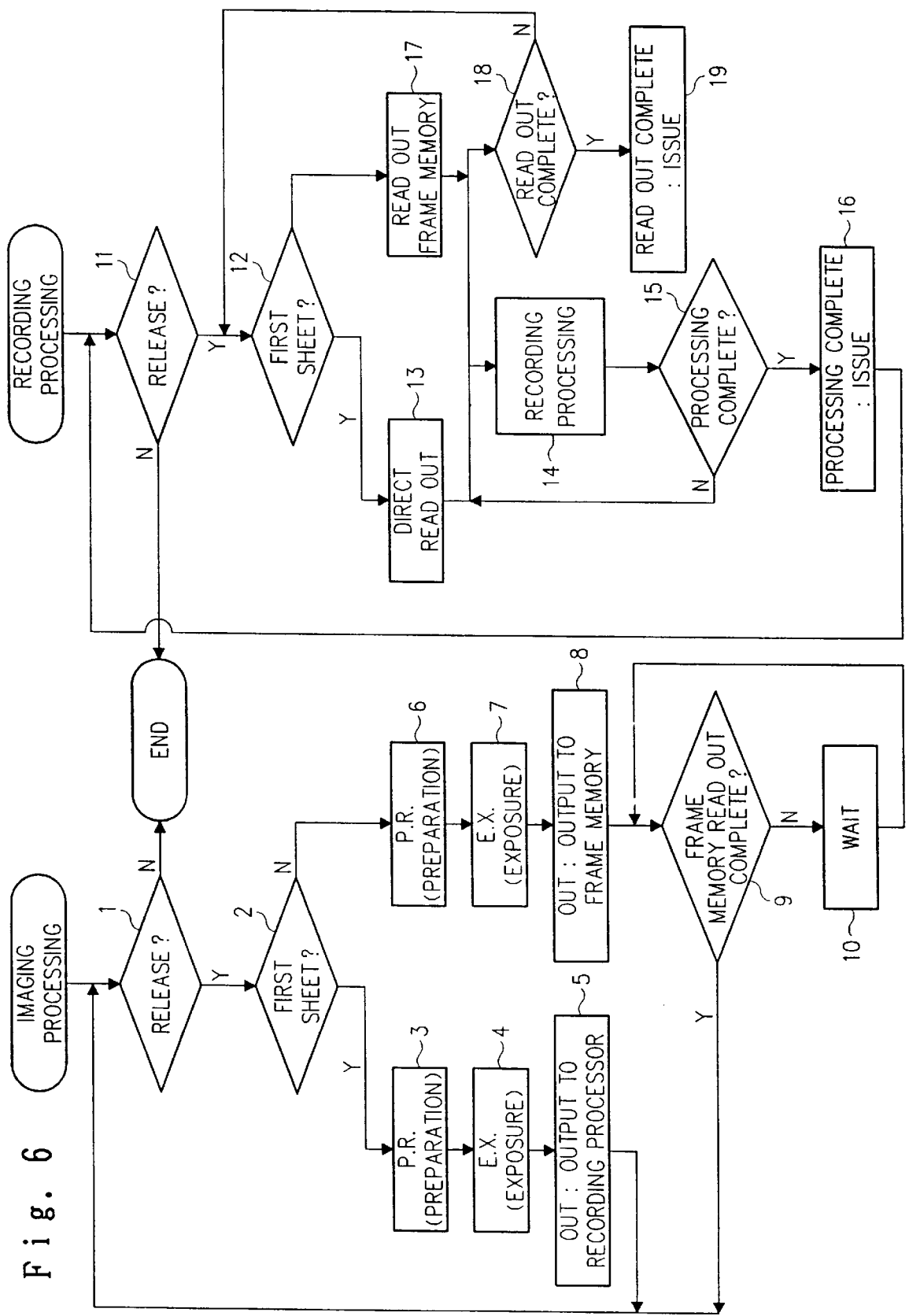
FIG. 6 is a flow chart showing an operation corresponding to the timing chart of FIG. 5.

FIG. 6 is a flow chart showing an operation corresponding to the timing chart of FIG. 5. In this flow chart, the recording processing operation for the signal (steps 14 and 15) and the read-out operation for the signal from the frame memory 4 (steps 17 and 18) in the recording processing are performed in pipeline processing and, according to circumstances, in parallel. The imaging processing is informed of the end of the read-out operation (step 19). Upon receiving this information (step 9), the imaging processing proceeds to a routine for capturing the next image plane (step 1).

When a user of the electronic camera refreshes a fixed pattern noise memory such as the non-volatile memory 3, the operations similar to those effected by the manufacturer at the time of shipment may be effected. When the non-volatile memory 3 has an ample capacity, another page may be provided so as to record the fixed pattern noise data separately from the data recorded at the shipment, whereby the user can arbitrarily select any page so as to obtain the fixed pattern noise data.

In the following, operations for effecting long-time exposure image-capturing by using an electronic camera will be explained. In general, when long-time exposure is effected by means of an imaging device such as CCD, the dark current of the imaging device greatly increases, thereby yielding a high dark output. It has been known that the dark current is generated with a time-lag, whereby the dark current suddenly increases after exposure is continued for more than a certain time. Accordingly, even in the case where the dark current is such an amount that it is not problematic and cannot be recognized as a change in the fixed pattern noise in a normal exposure time, it may not be neglected any more when the exposure time becomes so long that it reaches one second, for example.

In this case, it is assumed in general that, when the fixed pattern noise data for the dark current generated in the same long exposure time is recorded and subtracted from the output signal, the fixed pattern noise occurring due to the dark current can be corrected. This operation is considered to be attained when fixed pattern noise is integrally recorded for some times in the frame memory in the above-mentioned fixed pattern noise integration mode of (2) and then the image-capturing operation is effected in the real-time fixed pattern noise correction mode of (3). However, in order to detect a fixed pattern noise, it is necessary to integrate a sufficient number of sheets of dark current, thereby requiring a very long time when the exposure time is long. Also, when it takes a very long time to capture an image, the imaging device may be saturated with dark current.

This problem can be overcome when the above-mentioned signal integration buffer mode of (6) is used. Namely, a plurality of sheets of signals each having an exposure time which is not so long that the increase in dark current is problematic are integrated to form a single sheet of image. For example, it is assumed that an optimum exposure condition is attained with a predetermined stop and a predetermined exposure time as being judged by a certain separate photometer means. In this case, when n number of shots are effected with 1/n of the predetermined exposure time and then signals which have been subjected to n times of the fixed pattern noise correction are integrated, a long-time exposure operation can be substantially effected without being influenced by the fixed pattern noise occurring due to dark current. Also, since the integrating operation of the above-mentioned signal integration buffer mode of (6) can also be effected in continuous capturing of moving images, the long-time integration can be performed not only in combination of intermittent exposure times but also in the form of divisions of continuous exposure time.

Figure 7:
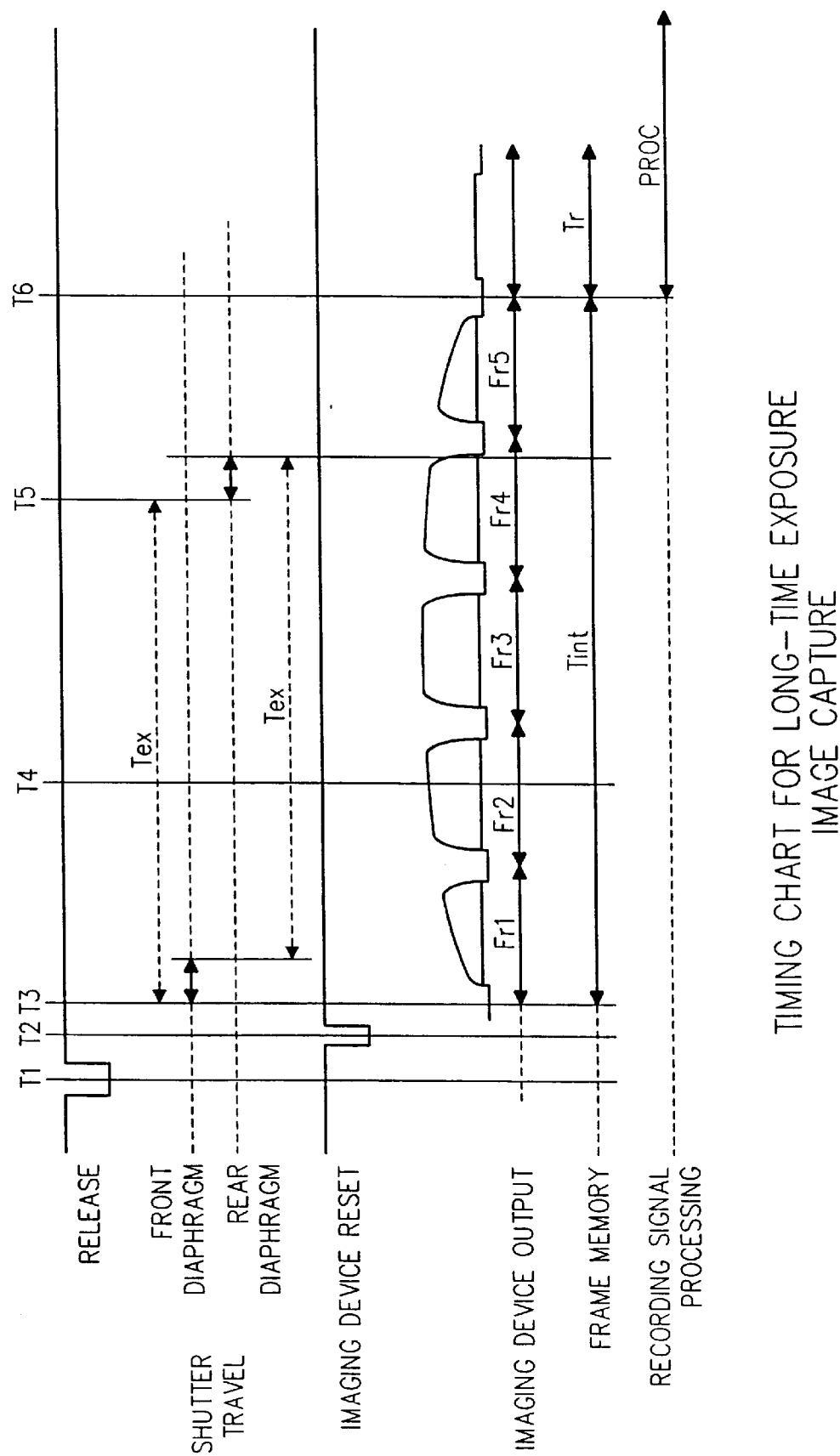
FIG. 7 is a timing chart explaining a long-time exposure image-capturing operation performed by the imaging apparatus of FIG. 3.

FIG. 7 shows an example of timing when a long-time exposure image-capturing operation is effected by an electronic camera using a focal plane shutter. As shown in this chart, a release signal is input at time T1 and, after necessary preparations such as photometry is effected, the imaging device 1 is reset at time T2 according to an instruction from the control circuit 6. Accordingly, the imaging device 1 begins to capture a moving image and, simultaneously, the frame memory 4 and processor 5 enter a time Tint for the above-mentioned signal integration buffer mode of (6).

At time T3, the front shutter diaphragm travels so as to initiate exposure. At time T4 in an exposure time Tex, signals which have been subjected to a fixed pattern noise correction by the processor 5 and frame memory 4 on the basis of the data read out from the non-volatile memory 3 are integrated per frame. Then, at time T5, the rear shutter diaphragm travels so as to complete the exposure. From time T5 till the video image output from the imaging device 1 is completed, namely, for a duration of at least one frame in general though variable according to the form of the imaging device 1, the time Tint for the above-mentioned signal integration buffer mode continues before the integrating operation is terminated. Then, at a signal read-out period Tr, image signal data X=C/m (m=1) is output to the signal output bus 12. Namely, the data C itself is output. Together with the starting of the signal read-out period Tr, the image data X output from the processor 5 is supplied to the signal recording processor 13 and then recorded there.

Further, in accordance with the present invention, the above-mentioned signal integration buffer mode of (6) may be used to perform multiple exposure. When the frame memory 4 has such a storage data width that up to the maximum value of the signal output data multiplied by k can be integrated, k-time multiple exposure is possible. In this case, n=m=k is set so that C/k is used as an output data signal to be subjected to recording processing. On the other hand, when n sheets of multiple exposure are necessary wherein n is not smaller than k, the multiple exposure is effected while exposure time for each shot is set to k/n of the optimum exposure time. Then, m=k is set so that C/k is also used as an output data signal to be subjected to recording processing. Accordingly, numerous times of multiple exposure can be effected without exceeding the data width of the frame memory.

Figure 8:
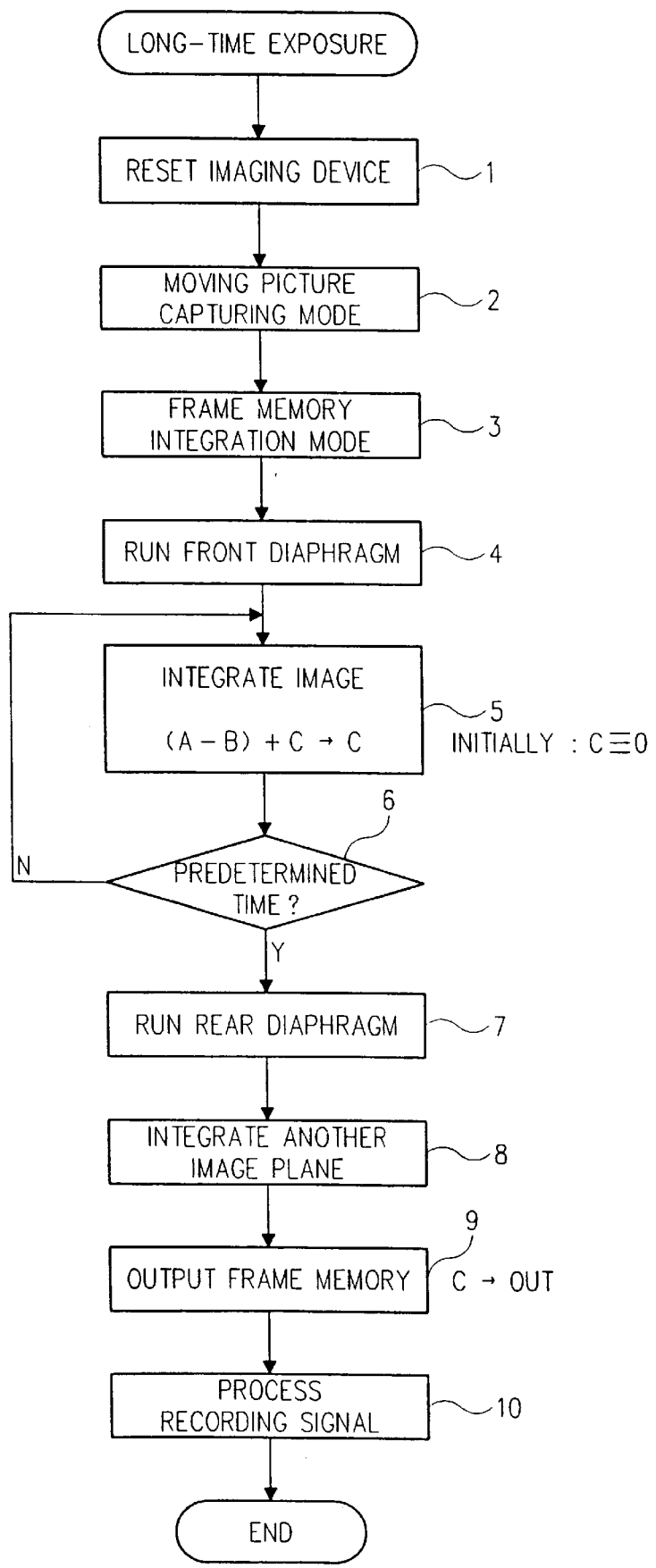
FIG. 8 is a flow chart showing an operation corresponding to the timing chart of FIG. 7.

FIG. 8 is a flow chart showing an operation corresponding to the timing chart of FIG. 7. In this flow chart, after the shutter is closed (after the travel of the rear diaphragm is completed; step 7), an additional sheet of image is integrated (step 8) in view of the delay of the exposure image output from the imaging device 1. This feature is common to imaging devices in general.

Figure 9:
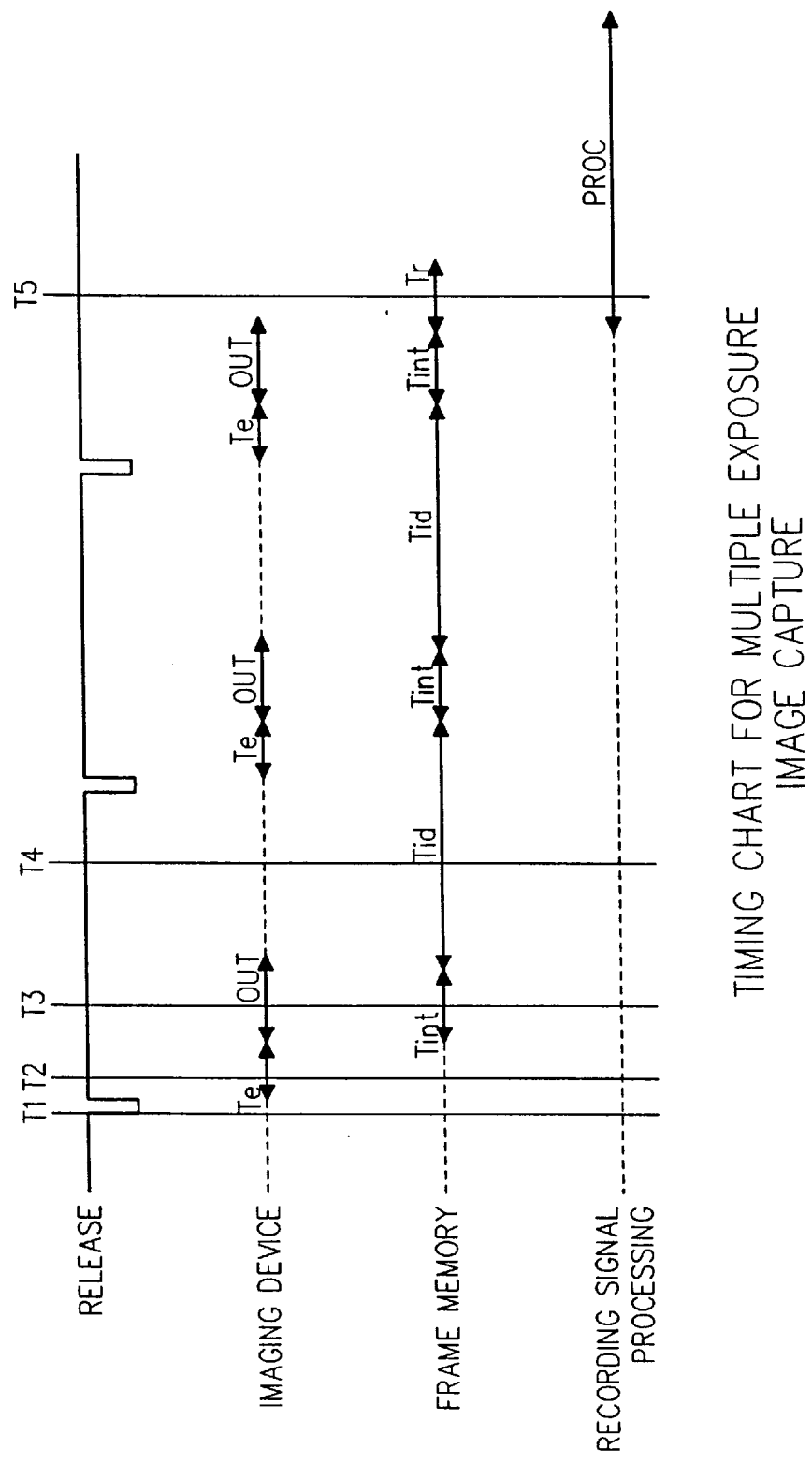
FIG. 9 is a timing chart explaining a multiple exposure image-capturing operation in the imaging apparatus of FIG. 3.

FIG. 9 shows an example of timing when such multiple exposure is performed by an electronic camera. In this case, it is assumed that the number of multiple exposure has been set to 3 beforehand and that the frame memory 4 has an integration capacity twice as much as the image data 2. When a release signal for the first sheet is input at time T1, exposure is effected during a period Te including time T2. This exposure time is set such that the exposure amount becomes ⅔ of that of the optimum exposure.

The imaging device 1 outputs an image signal at a period OUT including time T3, whereas the frame memory 4 begins an operation for integrating signals in which the fixed pattern noise has been corrected (Tint). After integration of one image plane is completed, the writing operation of the frame memory 4 is temporarily stopped to wait the next exposure (Tid). Similar operations are performed for capturing the second and third sheets in response to the input of the release signal. After exposure operations for a predetermined number of sheets are completed, the frame memory 4 begins a read-out operation (Tr), whereby image data of X=C/2 is output to the output bus 12 of the processor 5.

Figure 10:
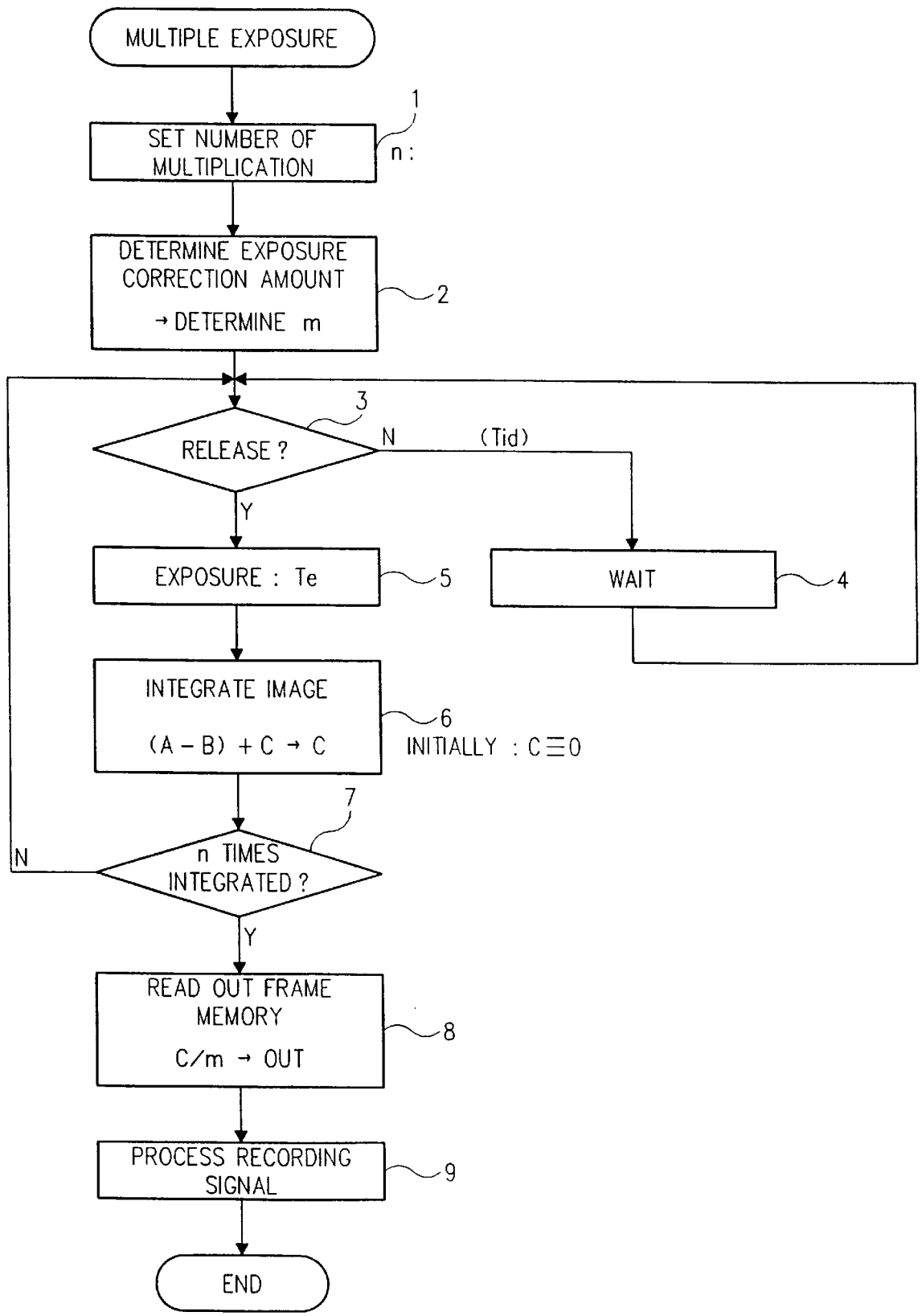
FIG. 10 is a flow chart showing an operation corresponding to the timing chart of FIG. 9.

FIG. 10 is a flow chart showing an operation corresponding to the timing chart of FIG. 9. In this flow chart, the reset operation of the imaging device 1 and the operation of the shutter are not shown. These operations accompany the exposure operation (step 5). After the shutter is closed (after the travel of the rear diaphragm is completed in the case of a focal plane shutter), the flow proceeds to the image read-out and integrating operation (step 6).

While the image integrating operation (step 5) is performed before the shutter is closed (step 7) in the flow chart of FIG. 8, the processing in the flow chart of FIG. 10 proceeds to the integrating operation (step 6) after the shutter is released (step 5) as mentioned above.

The foregoing operations refer to cases where a mechanical shutter is used. The operation becomes a little vague when the imaging device itself acts as an electronic shutter. In any case, identical images are continuously integrated in the mode shown in the flow chart of FIG. 8, whereas different images are intermittently integrated in the mode shown in the flow chart of FIG. 10.

Figure 11:
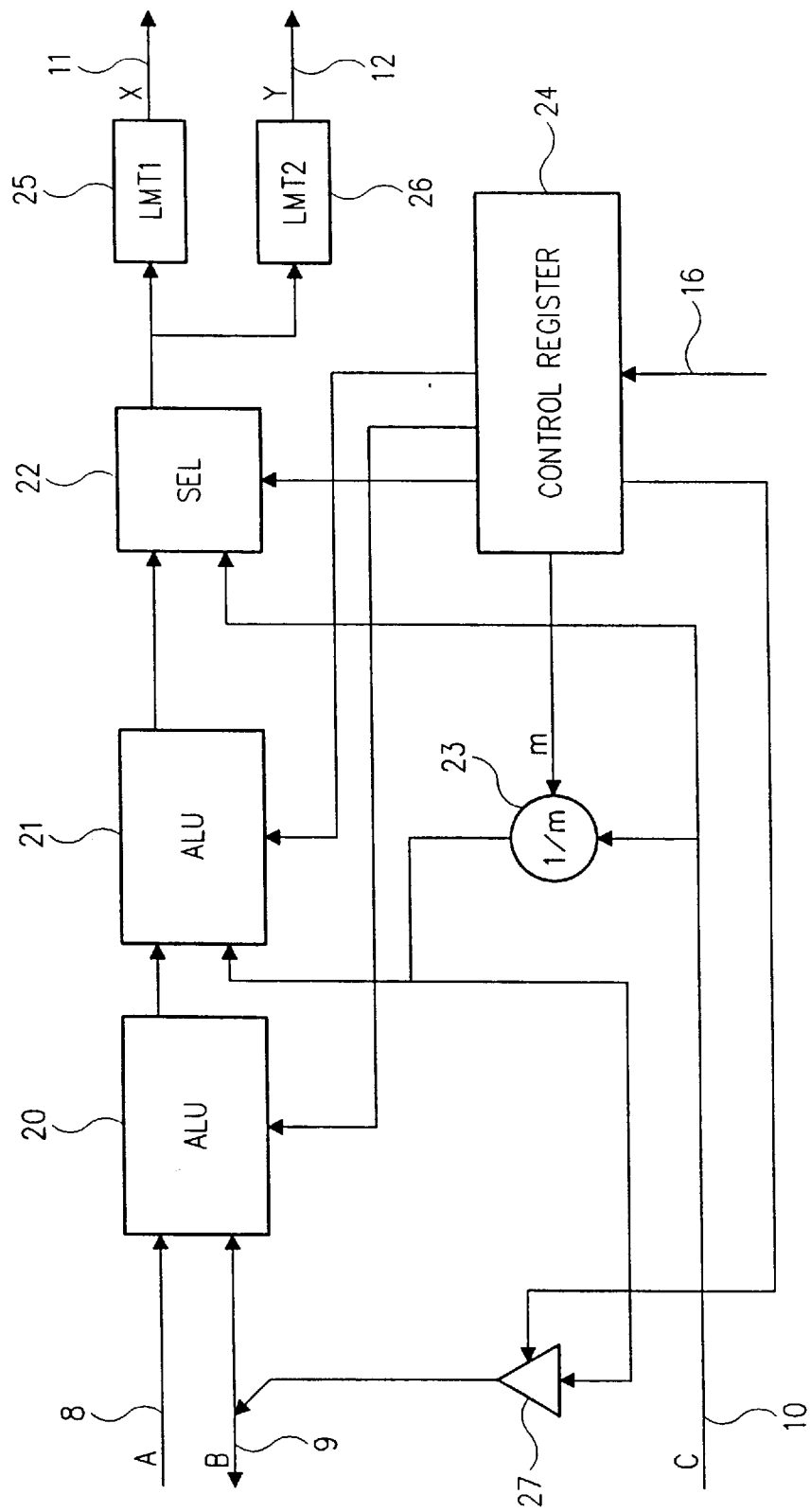
FIG. 11 is a block diagram showing a specific configurational example of a processor 5 in the imaging apparatus of FIG. 3.

FIG. 11 shows a configurational example of the processor 5. The circuit of this drawing is constituted by arithmetic logical units (ALU) 20 and 21, a signal selector 22, a control register 24, signal limiters 25 and 26, a tri-state buffer 27, a divider 23, and the like. The first ALU 20 is connected to the front-end signal processor and A/D converter 7 by the data bus 8, while being connected to the non-volatile memory 3 by the bi-directional data bus 9. The output of the ALU 20 is supplied to an input of the second ALU 21, whereas another input of the ALU 21 is configured so as to receive the output data of the divider 23. The output of the ALU 21 is connected to one of inputs of the signal selector 22, whereas another input of the signal selector 22 receives the read-out output of the frame memory 4 (cf. FIG. 3) by way of the data bus 10. The output of the signal selector 22 is transmitted through the signal limiters 25 and 26 to their output buses 11 and 12 so as to supply the input data to the signal recording processor 13 and the frame memory 4, respectively.

The control register 24 supplies control signals to the ALUs 20 and 21 in order to designate their respective operation modes such as addition and subtraction. Also, the control register 24 outputs a control signal to the signal selector 22 so as to specify which input the signal selector selects and outputs. Further, the control register 24 outputs a data indicative of divisor m to the divider 23. Here, when the divisor m is a product whose base is 2, the divider 23 may shift the bit of the input data so as to effect its dividing operation. The divider 23 divides the data read out from the frame memory 4 (cf. FIG. 3) by a given divisor m and supplies the result to an input of the ALU 21 and an input of the tri-state buffer 27. The tri-state buffer 27 is a buffer for transmitting the output C/m of the divider 23 to the bi-directional data bus 9 so as to be connected thereto with a necessary timing.

Though the signal limiters 25 and 26 may vary according to the data form used, they operate, for example, such that, when the result of subtraction A−B effected at the ALU 20 becomes negative, all the bits of this negative data are substituted by zero. Alternatively, for example, in the case where each of the data buses 11 and 12 and circuits connected to these data buses cannot handle a data larger than a 10-bit width, when a data having a bit width greater than this limit is generated as a result of the arithmetic operations by the ALUs 20 and 21 or the like, all the bits of the output data are set to 1.

In the configuration of FIG. 11, when a control code designating an operation mode is supplied from the control input 16 to the control register 24, each of the above-mentioned operation modes (1) to (6) can be effected.

According to thus input control code, the control register 24 outputs necessary control signals and data to the ALUs 20 and 21, signal selector 22, divider 23, and tri-state buffer 27, as mentioned above, so as to make them perform the operation of each mode.

For example, in the above-mentioned preset fixed pattern noise correction mode of (1), the ALU 20 is made to perform an operation of A−B, whereas the result of this operation is transferred by way of the ALU 21 and the signal selector 22 such that it is supplied as the data X and Y to the data buses 11 and 12 by way of the signal limiters 25 and 26, respectively.

Also, in the above-mentioned fixed pattern noise integration mode of (2), for the first one frame, the input data A is transmitted through the ALUs 20 and 21 and the signal selector 22, as it is, and then output to the data bus 12 as the output data Y through the signal limiter 26. For the next and later frames, the input data A is transmitted through the ALU 20 so as to be input into the ALU 21, whereas the read-out data C from the frame memory 4 is transmitted through the divider 23 or divided by the divisor m set to 1 and then supplied to another input of the ALU 21. Then, an addition of A+C is performed and the result is output by way of the signal selector 22 and the signal limiters 25 and 26.

The other modes can be similarly effected when the ALUs 20 and 21, signal selector 22, divider 23, and tri-state buffer 27 are appropriately operated according to the control signals from the control register 24 and data.

The circuit of FIG. 11 may also be constituted by a digital signal processor (DSP) and software for actuating it.

Though the following embodiments explain the case where the imaging apparatus in accordance with the present invention is used for an electronic camera, without being restricted to capturing of such a still image, the present invention can be suitably used for capturing a moving image when the signal recording processor 13 is provided with a frame memory for the moving image, for example.

As explained in the foregoing, in the imaging apparatus in accordance with the present invention, a non-volatile memory which is electrically rewritable is used as a memory for a fixed pattern noise data, while a frame memory which can integrally store a plurality of frames of image data is provided in addition to such a non-volatile memory such that these memories and the output of the imaging device can be mutually operated by an arithmetic circuit and output. Accordingly, without necessitating a backup power source or the like, the fixed pattern noise data can be refreshed at any time so as to correct the fixed pattern noise more precisely, thereby yielding a captured image with a high quality. Also, while correcting the fixed pattern noise, various operations such as long-time exposure, continuous image-capturing, and multiple exposure can be performed without using an additional memory, whereby an imaging apparatus with a high image quality and a variety of functions can be easily realized with a less hardware requirement.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Applications No. 60034/1995 filed on Feb. 24, 1995 and No. 182072/1995 filed on Jun. 26, 1995 are hereby incorporated by reference.

What is claimed is:

1. An imaging apparatus comprising:
an imaging device which has a plurality of pixels and captures image light from an object so as to output an image signal corresponding thereto;
a non-volatile memory for storing a data indicative of a fixed pattern noise for each pixel of said imaging device;
a frame memory which stores an integrated value of image signals output from said imaging device for each pixel among a plurality of frames; and
an arithmetic control circuit which performs an operation using the image signal output from said imaging device, the data read out from said non-volatile memory, and the data read out from said frame memory.

2. An imaging apparatus according to claim 1, further comprising a signal recording processor which records a data output from said arithmetic control circuit.

3. An imaging apparatus according to claim 1, wherein said imaging device is of amplification type having a light-receiving section and an amplifier section.

4. An imaging apparatus according to claim 3, wherein said light-receiving section is a buried photodiode and said amplifier section is a junction field effect transistor.

5. An imaging apparatus according to claim 1, wherein said arithmetic control circuit subtracts the data read out from said non-volatile memory from a value of the signal output from said imaging device and outputs the result thereof.

6. An imaging apparatus comprising:
an imaging device which has a plurality of pixels and captures image light from an object so as to output an image signal corresponding thereto;
a non-volatile memory for storing a data indicative of a fixed pattern noise for each pixel of said imaging device;
a frame memory which stores an integrated value of image signals output from said imaging device for each pixel among a plurality of frames; and
an arithmetic control circuit which performs an operation using the image signal output from said imaging device, the data read out from said non-volatile memory, and the data read out from said frame memory
wherein said frame memory stores an integrated data which is obtained when dark output values for each pixel from said imaging device are added together among a plurality of image planes and
wherein said arithmetic control circuit averages the data read out from said frame memory, which has thus stored the data, so as to attain a fixed pattern noise data for each pixel, subtracts said fixed pattern noise data from the image signal output from said imaging device, and outputs the result thereof.

7. An imaging apparatus comprising:
an imaging device which has a plurality of pixels and captures image light from an object so as to output an image signal corresponding thereto;
a non-volatile memory for storing a data indicative of a fixed pattern noise for each pixel of said imaging device;
a frame memory which stores an integrated value of image signals output from said imaging device for each pixel among a plurality of frames; and
an arithmetic control circuit which performs an operation using the image signal outDut from said imaging device, the data read out from said non-volatile memory, and the data read out from said frame memory wherein said non-volatile memory is rewritable;

wherein said frame memory stores an integrated data which is obtained when dark output values for each pixel of said imaging device are added together among a plurality of image planes; and wherein said arithmetic control circuit averages the data read out from said frame memory, which has thus stored the data, so as to attain a fixed pattern noise data for each pixel and writes said fixed pattern noise data in said non-volatile memory.

8. An imaging apparatus comprising:

an imaging device which has a plurality of pixels and captures image light from an object so as to output an image signal corresponding thereto;

a non-volatile memory for storing a data indicative of a fixed pattern noise for each pixel of said imaging device;

a frame memory which stores an integrated value of image signals output from said imaging device for each pixel among a plurality of frames; and an arithmetic control circuit which performs an operation using the image signal output from said imaging device, the data read out from said non-volatile memory, and the data read out from said frame memory wherein said arithmetic control unit makes said frame memory act as a buffer memory, subtracts the data read out from said non-volatile memory from the image signal output from said imaging device, outputs the result thereof while storing said result in said frame memory, and outputs the data read out from said frame memory, which has thus stored the data, for a subsequent frame.

9. An imaging apparatus comprising:

an imaging device which has a plurality of pixels and captures image light from an object so as to output an image signal corresponding thereto;

a non-volatile memory for storing a data indicative of a fixed pattern noise for each pixel of said imaging device;

a frame memory which stores an integrated value of image signals output from said imaging device for each pixel among a plurality of frames; and an arithmetic control circuit which performs an operation using the image signal output from said imaging device, the data read out from said non-volatile memory, and the data read out from said frame memory wherein said arithmetic control circuit subtracts, from the image signal for each pixel output from said imaging device, a data corresponding to said pixel read out from said non-volatile memory; integrates thus obtained data for each pixel for a plurality of image planes by adding said data together for each pixel; stores thus integrated data in said frame memory; and divides the data read out from said frame memory by a predetermined number which does not always coincide with the number of the plurality of image planes so as to attain an image signal for each pixel.

10. An imaging apparatus according to claim 1, wherein said frame memory is of FIFO type having an input and an output separated from each other.

11. An imaging apparatus according to claim 1, wherein the image can be captured in a plurality of modes according to control of said arithmetic control circuit.

12. An imaging apparatus comprising:

an imaging device which has a plurality of pixels and captures image light from an object so as to output an image signal corresponding thereto;

a non-volatile memory for storing a data indicative of a fixed pattern noise for each pixel of said imaging device;

a frame memory which stores an integrated value of image signals output from said imaging device for each pixel among a plurality of frames;

an arithmetic control circuit which performs an operation using the image signal output from said imaging device, the data read out from said non-volatile memory, and the data read out from said frame memory; and a signal recording processor which records a data output from said arithmetic control circuit;

wherein said arithmetic control circuit uses said frame memory as a buffer memory; subtracts the data read out from said non-volatile memory from the image signal output from said imaging device; outputs the result thereof while storing said result in said frame memory; successively supplying data obtained by said imaging device being exposed to the image light, by way of said frame memory, to said signal recording processor; and, after recording processing of the data for one frame is completed in said signal recording processor, supplies the data for the next frame from said frame memory so as to continuously capture the image.

13. An imaging apparatus comprising:

an imaging device which has a plurality of pixels and captures image light from an object so as to output an image signal corresponding thereto;

a non-volatile memory for storing a data indicative of a fixed pattern noise for each pixel of said imaging device;

a frame memory which stores an integrated value of image signals output from said imaging device for each pixel among a plurality of frames;

an arithmetic control circuit which performs an operation using the image signal output from said imaging device, the data read out from said non-volatile memory, and the data read out from said frame memory; and a signal recording processor which records a data output from said arithmetic control circuit;

wherein said arithmetic control circuit subtracts, from an image signal obtained from said imaging device by an image-capturing operation with an exposure time shorter than a desired exposure time, the data read out from said non-volatile memory; integrates the result thereof by adding together each result for a plurality of frames; stores thus integrated value in said frame memory; divides the data stored in said frame memory by a number smaller than the number of the frames of the stored image data; and outputs the result thereof so as to capture the image for a long time without being influenced by an increase in the fixed pattern noise caused by an increase in dark current.

14. An imaging apparatus comprising:

an imaging device which has a plurality of pixels and captures image light from an object so as to output an image signal corresponding thereto;

a non-volatile memory for storing a data indicative of a fixed pattern noise for each pixel of said imaging device;

a frame memory which stores an integrated value of image signals output from said imaging device for each pixel among a plurality of frames;

an arithmetic control circuit which performs an operation using the image signal output from said imaging device, the data read out from said non-volatile memory, and the data read out from said frame memory; and a signal recording processor which records a data output from said arithmetic control circuit, wherein, when a multiple exposure operation in which a desired number of sheets of image are added together in an imaging step and recorded in said signal recording processor is effected, said arithmetic control circuit reduces exposure time for one shot such that the data obtained when the value integrating the desired number of image data is within a range storable in said frame memory, integrates thus obtained image data by adding said data together, stores thus integrated data in said frame memory, divides the data stored in said frame memory by a value smaller than said desired number of sheets, and outputs the result thereof.

* * * * *